United States Patent [19]

Kobayashi et al.

[11] Patent Number: 5,499,696
[45] Date of Patent: Mar. 19, 1996

[54] DISK BRAKE

[75] Inventors: Kinzo Kobayashi; Shinji Suzuki, both of Yamanashi, Japan

[73] Assignee: Tokico Ltd., Kanagawa, Japan

[21] Appl. No.: 280,530

[22] Filed: Jul. 26, 1994

[30] Foreign Application Priority Data

Jul. 27, 1993 [JP] Japan ..................... 5-204793
Jul. 30, 1993 [JP] Japan ..................... 5-208777

[51] Int. Cl.⁶ ........................................ F16D 66/02
[52] U.S. Cl. ................................ 188/1.11; 188/73.1
[58] Field of Search ................... 188/1.11 W, 73.37, 188/73.38, 73.1

[56] References Cited

U.S. PATENT DOCUMENTS 4,498,559 2/1985 Katagiri et al. ............ 188/1.11 W
4,995,482 2/1991 Kobayashi et al. ........... 188/264 G X
5,299,663 4/1994 Kobayashi et al. .......... 188/1.11 W

FOREIGN PATENT DOCUMENTS 2103737 2/1983 United Kingdom ......... 188/1.11 W

Primary Examiner—Robert J. Oberleitner
Assistant Examiner—Kevin D. Rutherford
Attorney, Agent, or Firm—Wenderoth, Lind & Ponack

[57] ABSTRACT

A disk brake which is designed so that the sound pressure level of the alarm is stable. The disk brake includes a wear sensor composed of a mounting portion which is attached to an outer pad, and a pair of vibrating pieces extending circumferentially of a disk from the left and right ends of the mounting portion along a surface of the outer pad. Each vibrating piece includes an extended portion extending from the mounting portion, and a contact portion formed at the distal end of the extended portion in such a manner that the contact portion is bent toward the disk so as to extend around an edge of the outer pad. The contact portion has a distal end which is offset in the radially outward direction of the disk. The distal end of the contact portion is offset in the radially outward direction of the disk so that the end portion that comes in sliding contact with the disk lies within a braking surface of the disk which is in contact with the outer pad. The portion of the disk that is inward of the braking surface readily gathers rust. Therefore, the distal end of the contact portion is offset so as not come in contact with the portion where rust readily accumulates.

11 Claims, 6 Drawing Sheets

DISK BRAKE

BACKGROUND OF THE INVENTION

The present invention relates to a disk brake for a vehicle.

One example of conventional disk brakes is disclosed in Japanese Utility Model Application Public Disclosure (KOKAI) No. 5-12778 (corresponding to U.S. Pat. No. 5,299,663. The disk brake disclosed in this publication is generally characterized as follows. A cylinder block, which is provided on a caliper, is provided with an extension which extends across an inner pad, a disk, and an outer pad, and a pair of bifurcated claw portions are provided on the distal end of the extension so as to be capable of pressing the outer pad. In addition, a wear sensor is attached to the outer pad inbetween the claw portions.

The wear sensor is provided with a mounting portion which is attached to the outer pad, and a pair of vibrating pieces which extend circumferentially of the disk from the left and right ends, respectively, of the mounting portion toward the radially inward end of the outer pad along the outer surface of the outer pad. Each vibrating piece has an extended portion extending from the mounting portion, and a contact portion formed at the distal end of the extended portion in such a manner that the contact portion is bent toward the disk so as to extend around the inner edge of the outer pad as viewed radially of the disk. In this conventional disk brake, when the outer pad becomes worn to a predetermined extent, the distal ends of the contact portions come into scraping contact with the disk, causing the distal ends to vibrate. As a result, the vibrating pieces vibrate to sound an alarm, thereby informing the driver or other vehicle occupant that the outer pad has become worn.

Incidentally, in the above-described conventional disk brake, the contact portions lie in the vicinity of the inward end face of the outer pad as viewed radially of the disk. Therefore, in a case where the gap between the central cylindrical portion of the disk and the inward end face of the outer pad is extremely narrow, it may be impossible to provide the contact portions in the space therebetween and hence impossible to attach the wear sensor itself. In addition, the portion of the disk with which the distal ends of the contact portions come in contact are radially inward of a braking surface of the disk which is in contact with the outer pad. That is, the distal ends of the contact portions come in contact with a portion of the disk where rust readily accumulates because it is not swept by the outer pad. Therefore, when the distal ends of the contact portions come into scraping contact with the disk to sound an alarm, the sound pressure level of the alarm is not always stabilized because of the presence of the rust in the portion of the disk.

SUMMARY OF THE INVENTION

Under the above-described circumstances, it is an object of the present invention to provide a disk brake which is designed so that the sound pressure level of the alarm is stable.

To this end, the present invention provides a disk brake including a caliper provided with a cylinder block. The cylinder block has an extension which extends across an inner pad, a disk, and an outer pad. A pair of bifurcated claw portions are provided on the distal end of the extension so as to be capable of pressing the outer pad. A wear sensor is attached to the outer pad in between the pair of claw portions. The wear sensor includes a mounting portion which is attached to the outer pad, and at least one vibrating piece extending from the mounting portion along a surface of the outer pad. The vibrating piece includes an extended portion extending from the mounting portion, and a contact portion formed at the distal end of the extended portion in such a manner that the contact portion is bent toward the disk so as to extend around an edge of the outer pad. The contact portion has a distal end which is offset in the radially outward direction of the disk.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS

Figure 1:
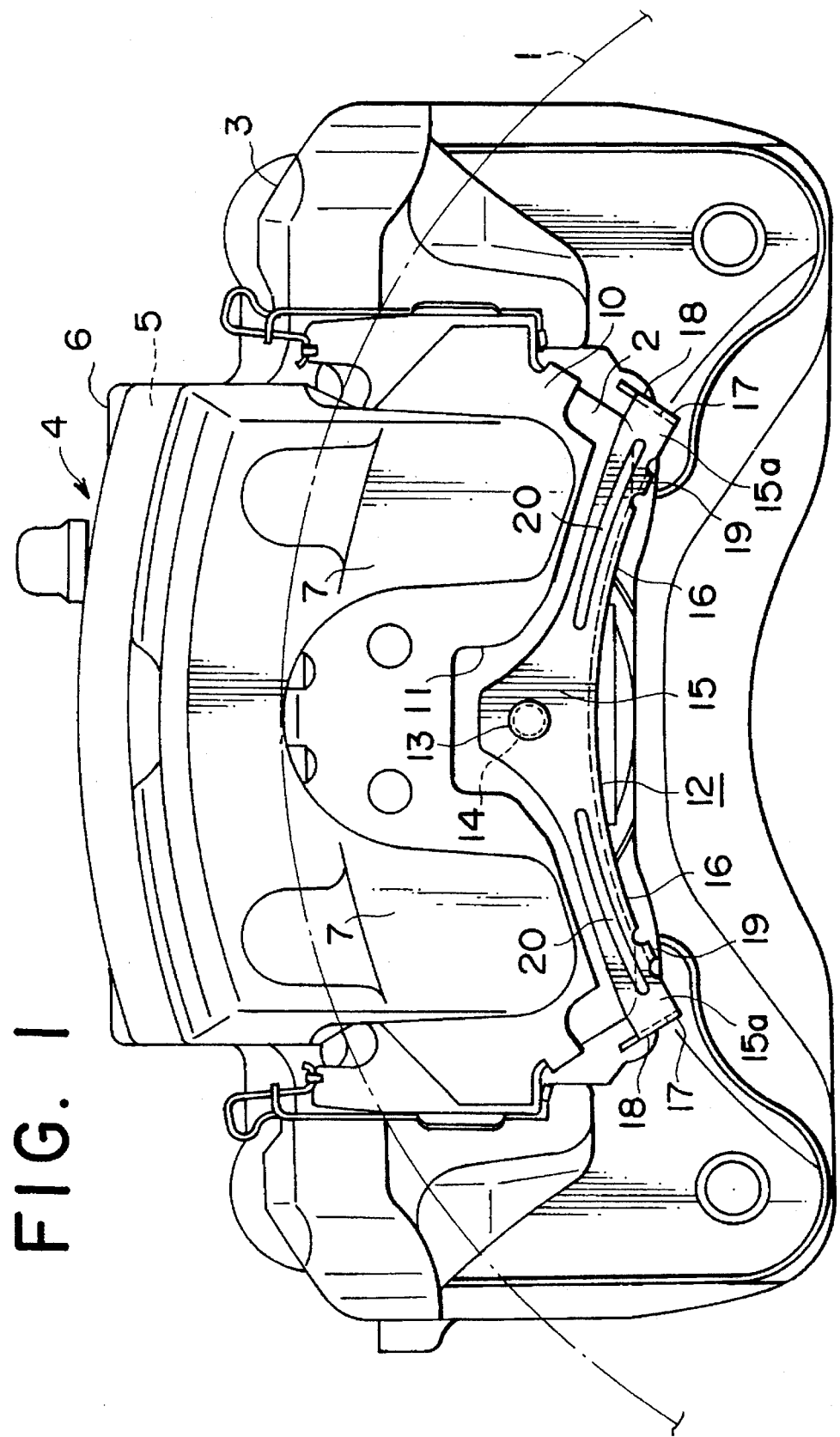
FIG. 1 is a front view of one embodiment of the disk brake according to the present invention.
Figure 2:
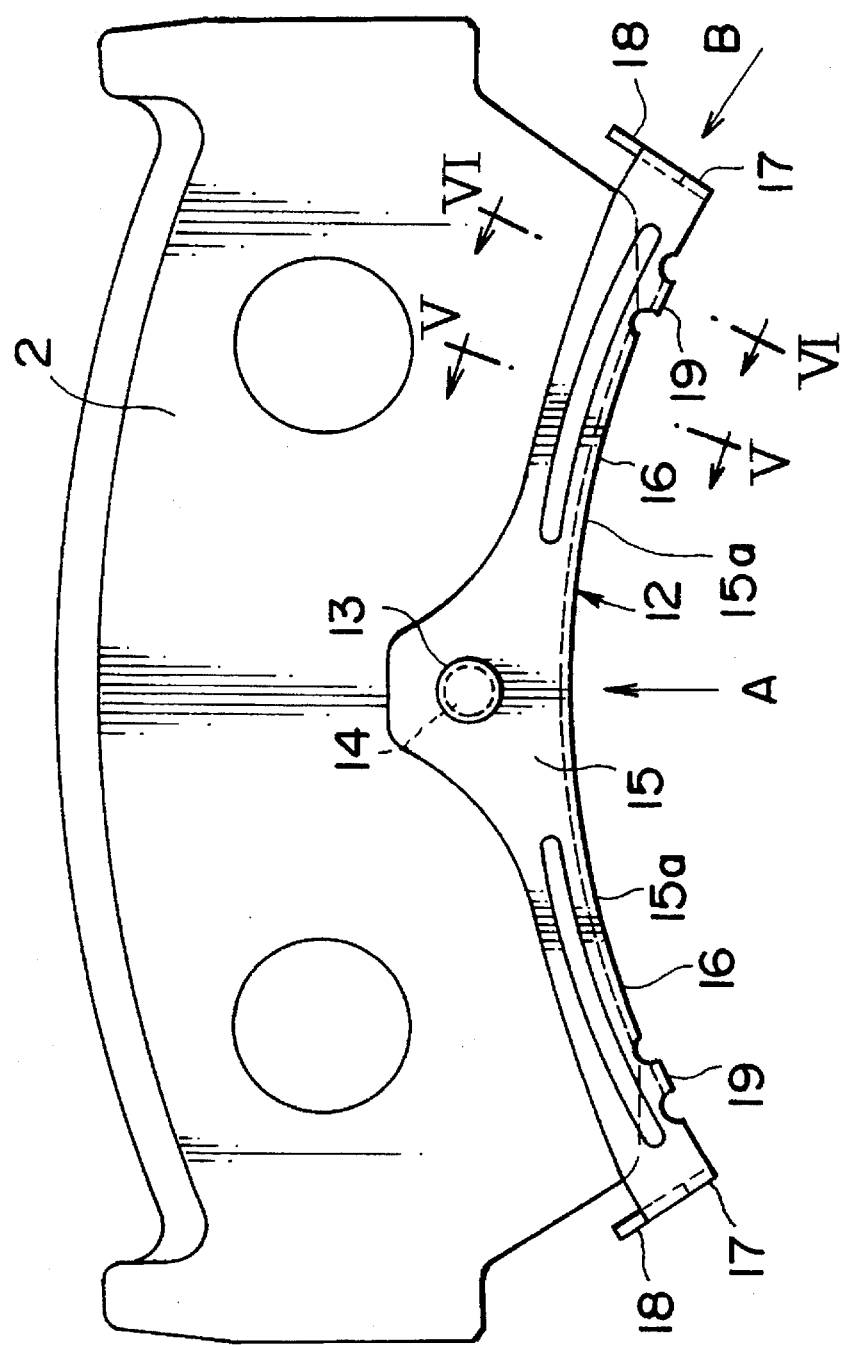
FIG. 2 is a front view showing a wear sensor employed in the embodiment, together with an outer pad equipped with the wear sensor.
Figure 3:
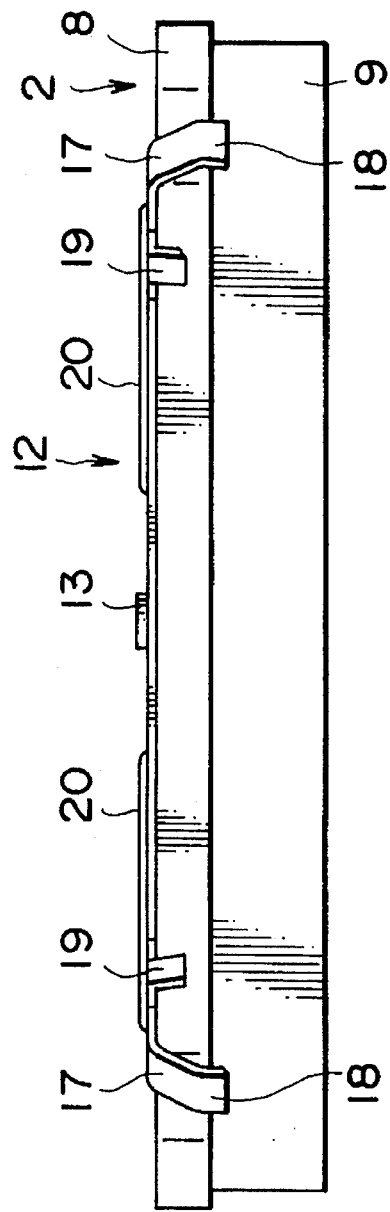
FIG. 3 is a view as seen from the direction of the arrow A in FIG. 2.

One embodiment of the present invention will be described below with reference to FIGS. 1 to 7. Referring to the figures, a disk 1 is secured to a wheel (not shown) of a vehicle, and an inner pad (not shown) and an outer pad 2 are disposed on both sides, respectively, of the disk 1. A carrier 3 is attached to a non-rotating part of the vehicle body, and a caliper 4 is supported by the carrier 3 through pins (not shown) so as to be movable in the axial direction of the disk 1. The caliper 4 is provided with a cylinder block 5 having a cylinder (not shown) which is open to the inner pad and which slidably accommodates a piston (not shown). The cylinder block 5 has an extension 6 which extends across the inner pad, the disk 1, and the outer pad 2. The distal end portion of the extension 6 is bent in a direction perpendicular to the axis of the disk 1 and is bifurcated to form a pair of claw portions 7.

In operation, as a brake fluid is supplied to the cylinder, the piston presses the inner pad against the disk 1, while the caliper 4 is moved in the opposite direction to that of the displacement of the piston by the reaction resulting from the pressing force applied by the piston, causing the pair of claw portions 7 to press the outer pad 2 against the disk 1, thereby generating a braking force.

The outer pad 2 is composed of an approximately rectangular backing plate 8 (see FIG. 3), and a friction member 9 which is approximately similar to the backing plate 8 and which is laid on top of the backing plate 8 and rigidly secured thereto. A noise preventing shim 10, which is approximately similar to the outer pad 2, is interposed between the outer pad 2 and the pair of claw portions 7 and supported by the outer pad 2 so as to prevent generation of noise, i.e., "brake noise", from the area of sliding contact between the inner pad and the outer pad 2 on the one hand and the disk 1 on the other during the braking operation. The noise preventing shim 10 has an approximately rectangular cut portion 11 formed in the lower portion thereof (as viewed in FIG. 1) between the pair of claw portions 7. A wear sensor 12 is attached to a portion of the outer pad 2 (between the claws 7) which corresponds to the cut portion 11 by caulking a projection 13 (namely, by deforming the top of the projection) provided on the backing plate 8.

The wear sensor 12 is composed of a mounting portion 15 which has a bore 14 in the center thereof for receiving the projection 13 and which is supported by the backing plate 8 by caulking the projection 13, and a pair of vibrating pieces 15a which extend circumferentially of the disk 1 from the left and right ends, respectively, of the mounting portion 15 along the surface of the outer pad 2. Each vibrating piece 15a includes an extended portion 16 and a contact portion 17 which is formed at the distal end of the extended portion 16 such that the contact portion 17 is bent toward the disk 1 so as to extend around the edge of the outer pad 2. The distal end 18 of the contact portion 17 is offset from the radially inward end face of the friction member 9 of the outer pad 2 by dimension "a" (see FIG. 7) in the radially outward direction of the disk 1. Thus, when the outer pad 2 becomes worn to a predetermined extent, the distal end 18 of the contact portion 17 comes into scraping contact with a portion of the disk 1 which is always in sliding contact with the friction member 9 and thereby swept, thus enabling an alarm to be stably sounded.

In addition, the lower end of the extended portion 16 is provided with a retaining piece 19 which is bent toward the disk 1 so as to extend around the inward edge (as viewed radially of the disk 1) of the backing plate 8 of the outer pad 2.

Figure 4:
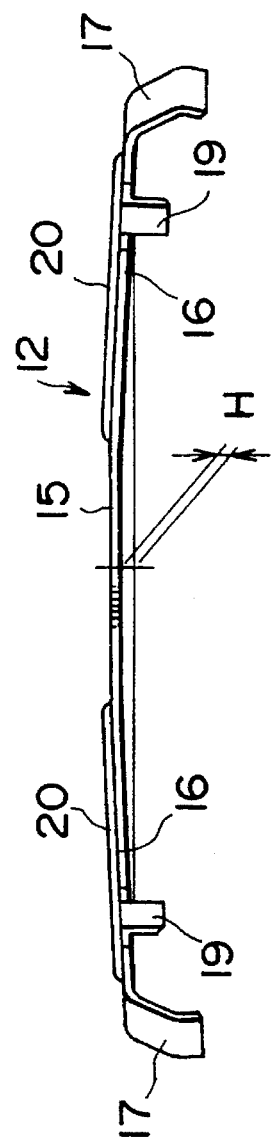
FIG. 4 is a side view of the wear sensor of the disk brake.
Figure 5:
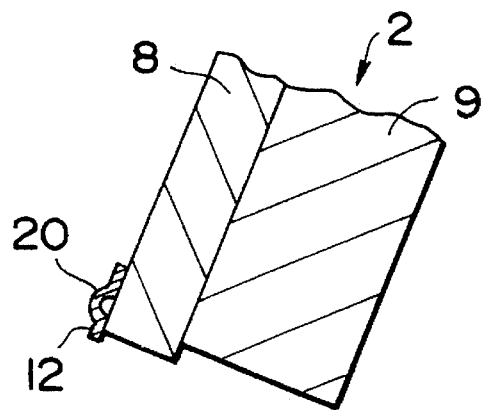
FIG. 5 is a sectional view taken along line V—V in FIG. 2.
Figure 6:
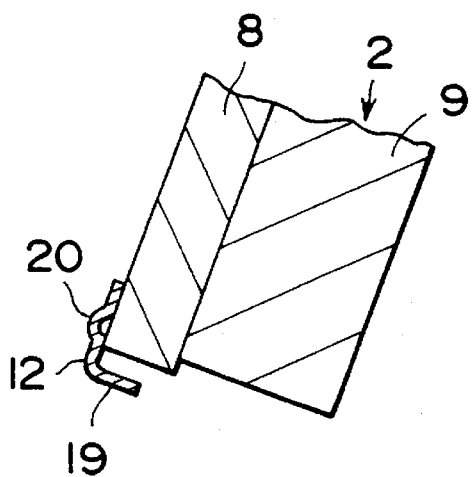
FIG. 6 is a sectional view taken along line VI—VI in FIG. 2.
Figure 7:
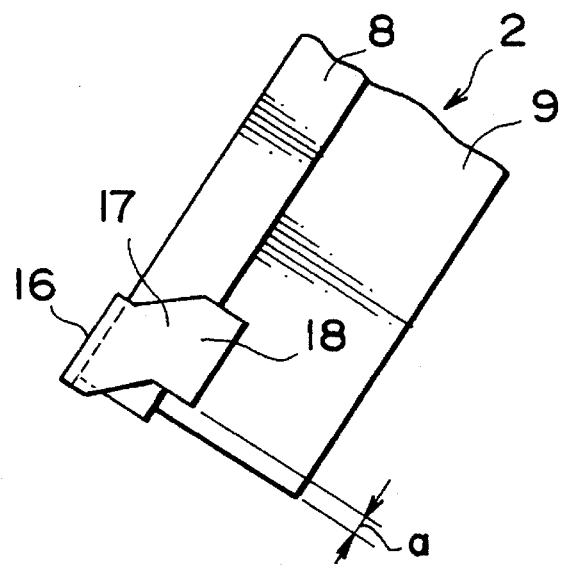
FIG. 7 is a view as seen from the direction of the arrow B in FIG. 2.

The pair of extended portions 16 are each formed with a longitudinally elongate projection 20 which projects away from the disk 1. With reference to FIG. 4, the extended portions 16 of the wear sensor 12 are bent toward the disk 1 with respect to the mounting portion 15 so that the mounting portion 15 is higher than the distal ends of the extended portions 16 by dimension H, thus forming a raised intermediate portion.

Next, the operation of the disk brake described above will be explained. The distal end 18 of each contact portion 17 comes in contact with the disk 1 when the outer pad 2 becomes worn to a predetermined extent, thereby sounding an alarm. Since the end portion that comes in contact with the disk 1 is outwardly offset as viewed in the radial direction of the disk 1, the contact portion lies within a braking surface of the disk 1 which is in contact with the outer pad 2. Accordingly, in the present invention the sound pressure level of the alarm can be stabilized in contrast to the prior art, in which the sound pressure level of the alarm is unstable because the contact portion lies radially inward of the braking surface of the disk 1, that it lies where rust is readily accumulated.

As has been described above, in the present invention the vibrating piece 15a is formed not by bending an end portion of a continuous, long plate member but by bending a plate member having such a configuration that the center of the extended portion 16 and the center of the contact portion 17 are offset from each other in a region in the vicinity of the boundary between these portions 16 and 17.

When the wear sensor 12 is to be mounted, the retaining pieces 19 can be used for positioning. Thus, positioning of the wear sensor 12 is facilitated. Accordingly, the disk brake is easy to assemble, and it is possible to speed up the manufacturing process and hence possible to reduce the production cost. Further, since the retaining pieces 19 are engaged with the backing plate 8 of the outer pad 2, a part of the load applied to the caulked projection 13 is borne by the engagement between the retaining pieces 19 and the backing plate 8. Thus, the load on the projection 13 can be reduced. In addition, the retaining pieces 19 prevent the wear sensor 12 from rotating about the projection 13.

Since the pair of extended portions 16 are formed with the respective elongate protrusions or embossed portion 20 (generically referred to as elongate projection), the rigidity of the extended portions 16 increases, and hence the overall rigidity of the wear sensor 12 increases. Therefore, the durability of the wear sensor 12 also improves, and hence the overall durability of the device improves. As a result of the improvement in rigidity of the extended portions 16, it is possible to prevent deformation of the extended portions 16 which might otherwise be caused by engagement of the wear sensor 12 with another object when the wear sensor 12 is attached to the outer pad 2 or during the actual use of the device after installation. If either of the extended portions 16 is deformed, the outer end thereof may come out of contact with the outer surface of the outer pad 2 in a state where the wear sensor 2 is attached to the outer pad 2, and if this occurs, the position of the contact portion 17 in the axial direction of the disk 1 changes, resulting in a change of the degree of wear of the outer pad 2 at which an alarm is to be sounded. Such a problem is overcome in the present invention.

In the embodiment shown in FIGS. 1 to 7, the wear sensor 12 is attached to the outer pad 2 by inserting the projection 13 into the bore 14 in the mounting portion 15 and then caulking the projection 13, as described above. Since the wear sensor 12 has a raised intermediate portion as described above, as the projection 13 is caulked to press the mounting portion 15 toward the outer pad, the distal end portion of each extended portion 16 is also pressed against the outer pad 2, and the extended portion 16 is brought into contact with the backing plate 8 without a gap over the entire surface thereof. Accordingly, even if the manufacturing accuracy of the wear sensor 12 is somewhat low, it is possible to prevent the distal end of the extended portion 16 from coming out of contact with the surface of the outer pact 2, and hence the amount to which the distal end 18 of the contact portion 17 projects toward the disk 1 can be made equal to a predetermined reference value. Thus, it is possible to ensure that an alarm will be sounded with high accuracy.

Figure 8:
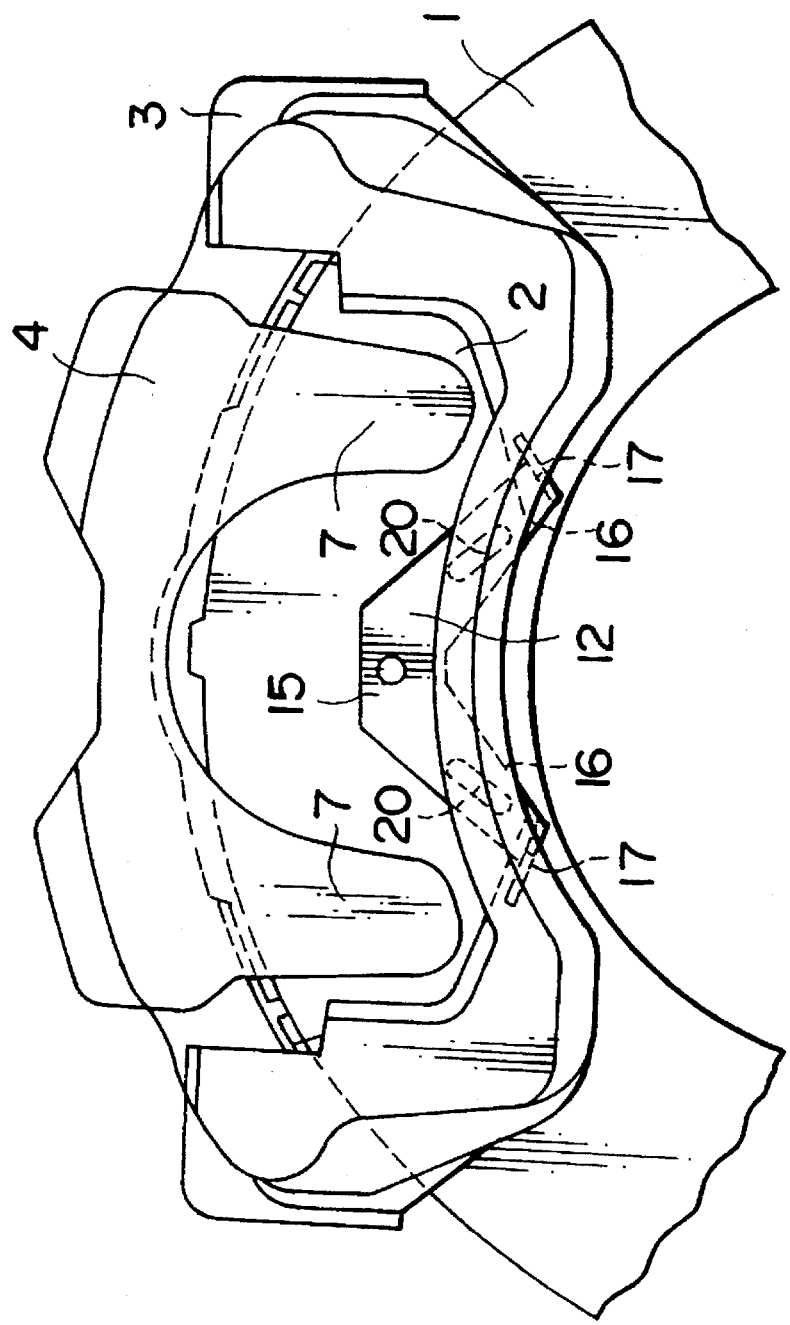
FIG. 8 is a front view of a disk brake using a wear sensor of a type different from the wear sensor shown in FIGS. 1 to 7.

FIG. 8 shows a second embodiment of the disk brake according to the present invention, which is realized by modifying the wear sensor of the disk brake disclosed in Japanese Utility Model Application Public Disclosure (KOKAI) No. 5-12778, which has been mentioned above. It should be noted that elements in the second embodiment which perform the same functions as those in the embodiment shown in FIGS. 1 to 7 are denoted by the same reference numerals, and a detailed description thereof is omitted.

In the embodiment shown in FIGS. 1 to 7, the extended portions 16 extend substantially in the circumferential direction of the disk 1, whereas in the embodiment shown in FIG. 8, the extended portions 16 extend such that the radial component is greater than that in the embodiment of FIGS. 1 to 7. In the second embodiment also, it is possible to ensure that each contact portion 17 will come in contact with the disk 1 in a region where the disk 1 is swept by the outer pad 2 by offsetting the contact portion 17 radially outward from the extended portion 16.

Figure 9:
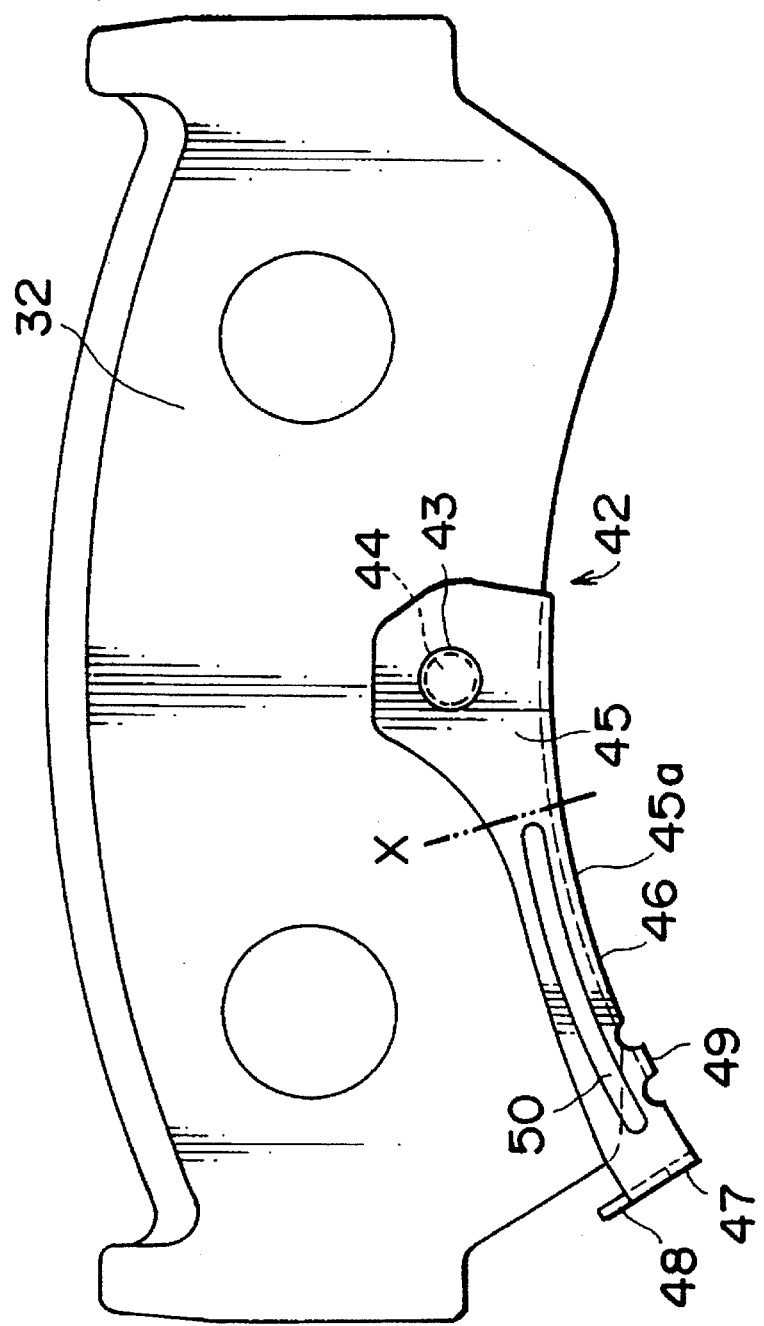
FIG. 9 shows a modification of wear sensor shown in FIGS. 1 to 7.

Although in the foregoing embodiments the wear sensor 12 is provided with a pair of extended portions 16 extending circumferentially of the disk 1 from the left and right ends, respectively, of the mounting portion 15 along the surface of the outer pad 2, it should be noted that a wear sensor arranged as shown in FIG. 9 may also be used in a disk brake. That is, a wear sensor 42 is composed of a mounting portion 45 which is attached to an outer pad 32, and a vibrating piece 45a which extends circumferentially of the disk from either of the left and right ends of the mounting portion 45 along the surface of the outer pad 32. The vibrating piece 45a includes an extended portion 46 and a contact portion 47 which is formed at the distal end of the extended portion 46 such that the contact portion 47 is bent toward the disk so as to extend around the edge of the outer pad 32. In this embodiment also, the distal end 48 of the contact portion 47 is offset in the radially outward direction of the disk. In addition, the lower end of the extended portion 46 is provided with a retaining piece 49 which is bent toward the disk so as to extend around the inward edge (as viewed radially of the disk) of the backing plate of the outer pad 32. Further, the extended portion 46 is formed with a longitudinally elongate projection or embossed portion 50 which projects away from the disk.

In addition, the wear sensor 42 is bent at the portion indicated by X so that the distal end of the extended portion 46 is elastically pressed against the outer pad 32 in a state where a projection 43 provided on the outer pad 32 is caulked after being fitted into a bore 44 provided in the mounting portion 45.

In the foregoing embodiments, the wear sensor is provided with an elongate projection, thereby possessing excellent durability. Therefore, the wear sensor is durable even when the width of the extended portion is reduced or the length of the extended portion is increased. Accordingly, it is possible to cope with any limitation on the space for installation of the wear sensor by narrowing or lengthening the extended portion.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A disk brake including an inner pad, a disk, an outer pad, a caliper provided with a cylinder block, said cylinder block having an extension which extends across said inner pad, disk, and outer pad, and has a distal end bifurcated to form a pair of claw portions capable of pressing said outer pad, and a wear sensor attached to said outer pad at a location between said pair of claw portions, said wear sensor including a mounting portion which is attached to said outer pad, and at least one vibrating piece extending from said mounting portion along a surface of said outer pad, said vibrating piece including an extended portion extending from said mounting portion, and a contact portion formed at a distal end of said extended portion, said contact portion being bent toward said disk so as to extend around an edge of said outer pad, said contact portion having a base end from which the contact portion extends directly from the distal end of said extended portion, and a distal end which is offset, relative to the base end of the contact portion, in the radially outward direction of said disk to such an extent that the entire distal end will, when said outer pad wears a predetermined amount, contact only that portion of the disk which comes into engagement with said outer pad.

2. A disk brake according to claim 1, wherein said at least one vibrating piece comprises two vibrating pieces which extend circumferentially of said disk from left and right ends, respectively, of said mounting portion.

3. A disk brake according to claim 2, wherein said extended portion is provided with a retaining piece which is bent toward said disk so as to extend around an inward edge of said outer pad as viewed radially of said disk.

4. A disk brake according to claim 2, wherein said wear sensor has means for preventing the distal end of said extended portion from coming out of contact with the surface of said disk.

5. A disk brake according to claim 1, wherein said wear sensor has means for preventing the distal end of said extended portion from coming out of contact with the surface of said disk.

6. A disk brake according to claim 5, wherein said preventing means is an elongated projection formed on said extended portion in such a manner as to project away from said outer pad and extend longitudinally of said extended portion.

7. A disk brake according to claim 5, wherein said preventing means is a bent portion provided on said wear sensor so that the distal end of said extended portion is elastically pressed against said outer pad.

8. A disk brake according to claim 1, wherein said extended portion is provided with a retaining piece which is bent toward said disk so as to extend around an inward edge of said outer pad as viewed radially of said disk.

9. A disk brake according to claim 1, wherein said outer pad comprises a friction pad and a backing plate backing said friction pad, and the distal end of said contact portion is spaced, in the radially outward direction of the disk, from a radially innermost end face of the friction pad.

10. A disk brake including an inner pad, a disk, an outer pad, a caliper provided with a cylinder block, said cylinder block having an extension which extends across said inner pad, disk, and outer pad, and has a distal end bifurcated to form a pair of claw portions capable of pressing said outer pad, and a wear sensor attached to said outer pad at a location between said pair of claw portions, said wear sensor including a mounting portion which is attached to said, outer pad, and at least one vibrating piece extending from said mounting portion along a surface of said outer pad, said vibrating piece including an extended portion extending from said mounting portion, a contact portion formed at a distal end of said extended portion, said contact portion being bent toward said disk so as to extend around an edge of said outer pad, and an elongate projection formed on said extended portion in such a manner as to project away from said outer pad and extend longitudinally of said extended portion.

11. A disk brake as claimed in claim 10, wherein said outer pad comprises a friction pad and a backing plate backing said friction pad, and the distal end of said contact portion is spaced, in the radially outward direction of the disk, from a radially innermost end face of the friction pad.

* * * * *